(12) United States Patent
Rutschmann

(10) Patent No.: US 9,159,092 B2
(45) Date of Patent: Oct. 13, 2015

(54) METHOD FOR SELECTING A SHOE FITTED TO A FOOT AND ASSEMBLIES THEREFOR

(75) Inventor: Dirk Rutschmann, Stuttgart (DE)

(73) Assignee: CORPUS.E AG, Stuttgart (DE)

( * ) Notice: Subject to any disclaimer, the term of this patent is extended or adjusted under 35 U.S.C. 154(b) by 808 days.

(21) Appl. No.: 13/183,895

(22) Filed: Jul. 15, 2011

(65) Prior Publication Data

US 2012/0013630 A1    Jan. 19, 2012

(30) Foreign Application Priority Data

Jul. 16, 2010   (DE) .......................... 10 2010 027 390

(51) Int. Cl.
| | |
|---|---|
| G09G 5/00 | (2006.01) |
| G06Q 30/06 | (2012.01) |
| G06T 11/60 | (2006.01) |
| G09G 5/14 | (2006.01) |

(52) U.S. Cl.
CPC ............ *G06Q 30/0621* (2013.01); *G06T 11/60* (2013.01); *G09G 5/14* (2013.01)

(58) Field of Classification Search
CPC .......... G06T 11/40; G06T 11/60; G09G 5/02; G09G 5/373; G09G 5/377; G09G 5/14
USPC ......................................... 345/419, 582, 619
See application file for complete search history.

(56) References Cited

U.S. PATENT DOCUMENTS

| | | | |
|---|---|---|---|
| 5,339,252 A | | 8/1994 | White et al. |
| 5,515,268 A | | 5/1996 | Yoda |
| 5,710,877 A | * | 1/1998 | Marimont et al. ............ 345/427 |
| 6,879,945 B1 | | 4/2005 | Cook |
| 6,975,232 B1 | | 12/2005 | McKenna |
| 7,446,884 B2 | | 11/2008 | Massen |
| 2006/0123183 A1 | * | 6/2006 | Koivisto et al. .................... 711/1 |

(Continued)

FOREIGN PATENT DOCUMENTS

| | | |
|---|---|---|
| WO | 00/69295 A1 | 11/2000 |
| WO | 2007/000758 A1 | 1/2007 |
| WO | 2009-006989 A1 | 1/2009 |

OTHER PUBLICATIONS

European Search Report issued on Nov. 15, 2011, a copy of which is enclosed, that issued in the corresponding European Patent Application No. 11174112.0.

(Continued)

*Primary Examiner* — Stephen R Koziol
*Assistant Examiner* — Terrell Robinson
(74) *Attorney, Agent, or Firm* — Cowan, Liebowitz & Latman, P.C.; Steven D. Underwood

(57) ABSTRACT

A method for selecting a shoe fitted to a foot from a plurality of shoes. For each shoe from the plurality of shoes, a dimensionally accurate outline of the footbed of the shoe is provided in electronic form. Further, for each shoe from the plurality of shoes, a dimensionally accurate outline of a section through the shoe, wherein the sectional plane runs perpendicularly to the footbed and along the way of largest foot length of a foot positioned in the shoe, is provided in electronic form. Further, an assembly for selecting a shoe fitted to a foot from a plurality of shoes including a data processing system with a database and an output unit, as well as an assembly for simultaneous representation of the footbed outline and the sectional outline to scale for a shoe corresponding to the method with two flat screens perpendicular to each other are provided.

16 Claims, 9 Drawing Sheets

(56) References Cited

U.S. PATENT DOCUMENTS

| | | |
|---|---|---|
| 2007/0288332 A1 | 12/2007 | Naito |
| 2008/0168684 A1* | 7/2008 | Khalifa .......................... 36/102 |
| 2008/0292179 A1* | 11/2008 | Busch .......................... 382/154 |
| 2009/0051683 A1 | 2/2009 | Goonetilleke et al. |
| 2009/0073162 A1* | 3/2009 | Waatti et al. .................. 345/419 |
| 2009/0287452 A1* | 11/2009 | Stanley et al. ................ 702/155 |

OTHER PUBLICATIONS

The above US documents 1 and 2 and foreign patent document 1 were cited the German Search Report of 20 2010 027 390.2 Jun. 14, 2011, a copy of which is enclosed without an English Translation.

* cited by examiner

METHOD FOR SELECTING A SHOE FITTED TO A FOOT AND ASSEMBLIES THEREFOR

BACKGROUND OF THE INVENTION

The invention relates to a method for selecting a shoe fitted to a foot and assemblies therefore.

The internet based order of footwear is a branch of business with fast increasing importance. Numerous online suppliers such as for example www.zalando.de or www.mirapodo.de offer a great selection of street, sports and child's shoes via their web portal, which can be ordered by selection of a desired brand and shoe shape as well as the corresponding shoe size. Since this internet shoe trade inevitably proceeds without trying on procedure, the selection of the correct fit is critical.

Usually, the information to the fit reduces to the specification of a shoe size, optionally in addition with attributes such as "narrow", "normal" or "wide" foot shape. These specifications usually are not selective and highly different from shoe manufacturer to shoe manufacturer despite of numerous standardizations.

Thus, for example, an examination of the corpus.e AG, Stuttgart, on behalf of the sports magazine Motorpresse GmbH, with the aid of 3D foot scanners and a newly developed inner shoe shape scanner, has shown that despite of identically specified shoe size, the foot lengths between the models of different manufacturers already actually differ by up to 2 sizes (see magazines RoadBike April 2009, and Outdoor October 2009, Verlag Motorpresse Stuttgart).

This state has resulted in the specification of a shoe size not meaning a guarantee for good fit.

Therefore, the assistances offered by most of the online shoe shops for determining the correct shoe size also cannot lead to the goal, because only a correlation between the foot site determined more or less exactly by the customer and the associated standard shoe size is respectively established, and lacks the professional knowledge of the shoe salesperson ("these shoes are slightly small" or "they certainly are too wide for you"...).

To the assistances offered by the online shoe shops, there belong size tables, which translate the length measurement to be performed by the customer himself (heel to tip of the big toe) into a standard shoe size system, however, these tables only allow the translation of the foot length in millimeters into the standard shoe sizes according to EURO, UK or US standard.

Further, there are fit tables, which also consider the foot width and the calf circumference. U.S. Pat. No. 6,879,945 B1 of the company NIKE INC. discloses the use of printable foot sole templates, with which the customer can measure the required standard shoe size himself at home.

It is also remarkable that all of these current methods, which always only provide a standard shoe size anyway, are only based on the 2D image of the foot sole and e.g. do not consider the arch height.

The verification of the fit based on a comparison of the 3D foot shape of the customer with the 3D interior space of the potential shoe such as are performed by the Stuttgart company corpus.e AG with the aid of a 3D shoe interior space scanner completely lacks (see also: R. Massen, D. Rutschmann: inexpensive and calibration-free 3D digitalization of feet and shoe interior spaces. Orthopädie-Technik edition 9, 2009).

All of the current simple assistances that the online portals offer to their customers cannot solve two principal difficulties of the online shoe trade in satisfactory manner:
 a) the customer cannot previously try on the ordered shoe
 b) the dialogue with the trained sales personnel lacks.

As a result of the inconsistency of the shoe size specifications between the various manufacturers and the extensive restriction to linear dimensions, which only describe the footbed, it is very difficult for the online customer to reliably order the fitting shoes. Often, it is required to return the delivered shoes, a procedure that is associated with considerable costs for the online supplier and remains little satisfactory for the customer.

Therefore, it is not amazing that at present the online shoe business is characterized in that a great number of ordered shoes sent to the customer are again returned to the shoe retailer since the fit is not correct.

This return is extremely expensive since besides the pure transport costs, the returned shoes have to be unpacked, controlled for damage and again be input in storage in a personnel intensive way. All of the advantages of a widely automatically and electronically proceeding order process are thereby rendered void.

The Today's yields in the online shoe business are therefore still negative in the most portals. The actors on this market presently take this losses in order to be present in the Internet in time and to participate in the expected increasing online market in time.

SUMMARY OF THE INVENTION

It is desirable to be able to determine if a certain shoe model in a certain shoe size will fit without trying on shoes.

A method is required, which allows without expensive devices at the customer to make a prediction if desired shoes will fit him.

In particular, a simple and inexpensive method is sought, with which returns due to non fitting shoes can be avoided in the online order of footwear.

This method should dispense with expensive devices such as 3D scanners, photogrammetric 3D photography, auxiliary scales etc. and be able to be performed in comfortable and easy manner even by the inexperienced online customer at home at the normal computer with Internet access.

This is achieved with the method according to claim 1 and the assembly according to claim 14 and briefly described is based on the purely visual comparison of the foot to be dressed with two computer graphics performed by the customer:
 a) comparison of the foot sole shape of the customer with a silhouette of the foot sole bed of a shoe to be examined represented on the flat screen of a computer
 b) comparison of the side view of the foot of the customer with a silhouette represented on the flat screen of a computer, which reproduces the vertical sectional plane through the interior space of the shoe to be examined, sectioned along the line of maximum foot length (big toe to heel).

The method according to the invention takes advantage of the high visual intelligence available with each human in comparison and assessment of graphical shapes. Therein, it takes advantage of the inherent visual comprehension of a good fit even with the little experienced customer:

"Footwear fits if a sufficient shoe length and sufficient free space in the toe region are present upon view of the footbed AND if a sufficient height in the entire space occupied by the foot is present in the region of the top foot, wherein the heel abuts fixedly guided the shoe interior wall of the heel region".

According to claim 1, the method includes providing a dimensionally accurate outline of the footbed for each shoe from a plurality of shoes, thus ideally for example from all of the shoes of the offer of the online shoe shop. The computer-aided creation of this silhouette or outline is prior art:

each foot sole construction software possesses tools for acquiring a footbed outline.

Further, the method includes providing a dimensionally accurate outline of a section through the shoe, wherein the sectional plane runs perpendicularly to the footbed and along the way of the largest foot length of a foot positioned in the shoe, also for each shoe from a plurality of shoes, thus here too, ideally for example from all of the shoes of the offer of the online shoe shop.

The creation of this silhouette is also prior art:

corpus.e AG has developed an optical scanner for measuring the 3D interior space of footwear under the designation "lightbeam®-inside" (see WO 2009/006989 A1 and U.S. Pat. No. 7,446,884 B2), which provides a numerical 3D model of the interior space. From this model, the shoe inner shape outline can be produced by a correspondingly oriented sectional plane.

The outlines are represented to scale on a flat screen. The optionally required previous geometric calibration of the screen is known. The company Ricosta GmbH (www.ricosta.de) uses for example a screen mask to this, which represents the outline of a CD. The customer places a CD on the flat screen and adjusts a slide control until the represented image of the CD coincides with the outline of the applied CD.

Subsequently, according to claim 1, the foot is positioned on and in front of the flat screen, respectively, such that preferably only a circumferential edge of the represented outline remains visible. The edge remaining visible serves for visual comparison between foot outline and represented (interior) shoe outline.

Here, the visual intelligence of the human visual system is exploited. Even in acquisition situations uncalibrated in the photogrammetric sense, such as varying distance, inclined sight etc., the human can well compare outlines and easily recognize and assess the specific shape deviations.

In a preferred embodiment, a high contrast between the color of the outline area and the background color is selected, for example white and black, in order that the visual perception capability of the human is better exploited.

Preferably, the edge region of the outlines of the footbed and/or the side view is graphically designed such that an impression of the amount of deviation between represented outline and the outline of the foot easily to be visually interpreted arises. The human perception system can be still further assisted in that the graphical design is composed of a color gradient proceeding radially to the outline edge. For example, this can occur by a graphically designed edge zone, which for example changes from a neutral, little conspicuous color on the outline edge to a conspicuous color towards the center of the outline.

In an embodiment, only the anatomically critical regions such as toe region, ball region, heel are graphically occupied by color and/or textures such that the visually visible regions appear the more conspicuous, the greater the mismatch is.

In an embodiment, additional information fields and/or scales are superimposed on the background area. mm scales for assessing the size of the non-fit, rotation tools for aligning the silhouettes on the foot position in front of the screen, silhouettes of the interior space, which have been created along another alignment such as along a line heel to little toe etc. can belong to this.

In an embodiment, in the manner of a slide show, several outlines of different shoes are displayed in fast sequence consecutively in time, such that they can be compared with the non moved foot and the user can quickly recognize and exclude the unique mismatches. In an embodiment, therein, the outlines for different shoe sizes can be consecutively displayed for the same shoe model. In another embodiment or in another operating mode of the same embodiment, outlines of different shoe models are displayed for the same shoe size.

If the flat screen present at the customer is smaller than the foot to be dressed, thus, in an embodiment, the representation of the outlines can be split in one corresponding to the front foot portion and a second one corresponding to the rear foot portion.

This restriction has become meaningless in many households because usually television flat screens are present, which are large enough for all foot sizes. All of these television flat screens have computer interfaces and therefore can be employed for performing the inventive idea.

So-called tablet PCs can also be used as flat screens, which integrate all of the required computer components including Internet access in a mobile housing such as in example the IPAD computer of the company Apple Cupertino, USA (www.apple.com/ipad). They have flat screens, which are mobile, which can be arbitrarily oriented in the space, and which can be approached to the foot to be dressed and be oriented such that the viewer can at the same time visually superimpose the outlines of the foot and graphical templates on the screen and compare them in shape and size.

In a preferred embodiment, for limiting the suitable shoe candidates, the outer contour of the foot and the outer contour of the side view of the foot is traced by the customer with a stylus and the thus created outline of the foot to be dressed is acquired and a pre-selection of possibly fitting shoes from the plurality of shoes is made due to this outline. This acquisition can be effected on paper and then be scanned.

Preferably, a touch-sensitive screen is used and the foot is directly traced on the screen, thereby, the scanning operation can be omitted.

The outline is made known to the database. Thereby, the search space in the database can be restricted to such shoe candidates, the footbed silhouette and interior space silhouette of which are sufficiently similar to the foot to be dressed in order to allow sufficient fit at all.

If a touch-sensitive screen is employed, there can also be made inputs via stylus or finger touch for calculating distances, to the program flow etc.

Further, an assembly is provided, by which the selection of a shoe fitted to a foot from a plurality of shoes can be effected. The assembly includes a data processing system with a database and an output unit according to claim 14.

In a further embodiment, which is particularly suitable for performing the method in a shoe shop, which either offers also catalogue orders in addition to the shoes in stock or desires to reduce the number of shoes to be tried on for the customer. According to claim 15, the assembly includes two screens disposed perpendicularly to each other, wherein the customer can place himself on the horizontally disposed screen protected by a robust glass plate and the sales personnel can directly compare both outlines with the foot of the customer.

BRIEF DESCRIPTION OF THE DRAWINGS

The method according to the invention and the assembly for performing the method are further explained using the example of an online order of child's shoes. This is not to be understood in a limiting manner, but allows a simpler description of the inventive idea and of its teachings. Herein, reference is made to the following figures.

DETAILED DESCRIPTION

Figure 1:
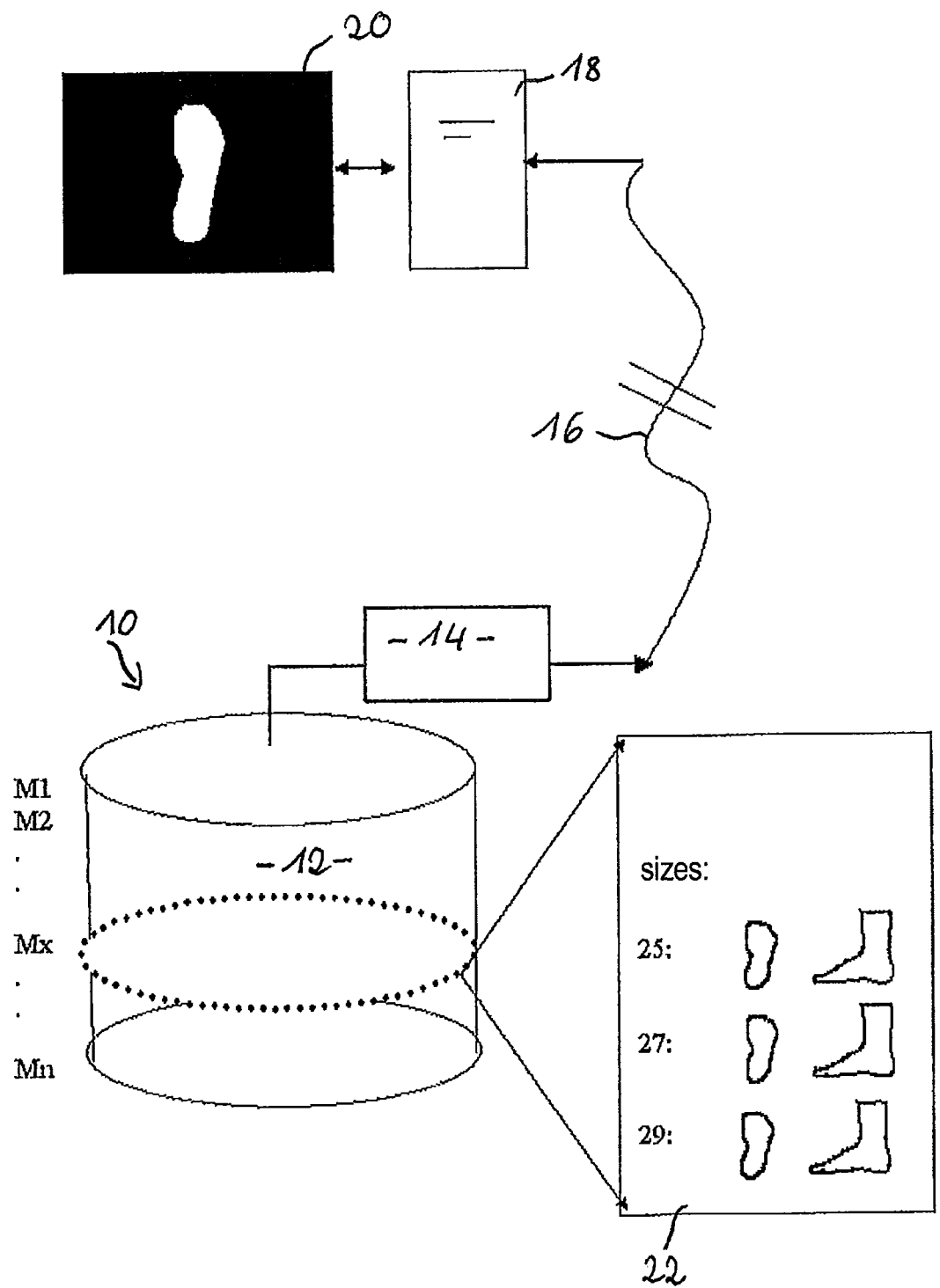
FIG. 1 shows the assembly required for performing the method according to the invention in a block diagram.

FIG. 1 shows an assembly according to the invention in a block diagram, by which the method according to the invention can be performed. A data processing system 10 includes a database 12 with an output unit 14.

The output unit 14 is connected to a transmission link 16, which is for example part of the Internet. On the customer side, the transmission link 16 is connected to a computer 18 having or being connected to a flat screen 20.

In the database 12, a dimensionally accurate outline of the footbed and a dimensionally accurate outline of a section through the shoe are stored for each shoe from a plurality of shoes, namely for each shoe model in each shoe size. The stored data are indicated with the letter-number combinations M1 to Mn. In a box 22, it is exemplarily represented that the dataset Mx for a shoe model for the shoe sizes 25, 27 and 29 each contains a footbed outline and a sectional outline. This outline data can be integrated in an existing database, in which the usual data for the respective shoe model such as textual article description and photographic illustrations as well as prices is already stored.

According to the invention, the sectional outline is created along a sectional plane, which runs perpendicularly to the footbed and along the way of the greatest foot length of a foot positioned in the shoe. The storage in the database 12 is effected in known manner in electronic, digital form.

The output unit 14 is configured such that the outlines stored in the database are transmitted to the terminal 18 such that a display of the outlines to scale is possible on the flat screen 20.

The customer utilizes the computer 18 having a connection to the transmission link, for example an Internet access. The computer 18 is equipped with the flat screen 20, which is preferably large enough to accommodate a foot. In case the screen is smaller, the outline representation is split in two portions, in the front foot portion on the one hand, and the rear foot portion on the other hand. The outlines of a selected shoe model and of a selected shoe size are transmitted to the customer, for example upon corresponding request, via the transmission link 16. In FIG. 1, the outline of a footbed of a shoe is represented in white on a black background. A distinct contrast between outline area and background area facilitates the distinguishability of deviations between foot shape and outline for the customer.

FIG. 2 illustrates how the selection of a shoe fitted to a foot from a plurality of shoes is effected first for the fit of the footbed. As already explained in context of FIG. 1, a dimensionally accurate outline of the footbed of the shoe is stored in the database 12 for each shoe from the plurality of shoes in electronic form. Similarly, a dimensionally accurate outline of a section through the shoe is found for each shoe from the plurality of shoes, wherein the sectional plane runs perpendicularly to the footbed and along the way of the greatest foot length of a foot positioned in the shoe.

Figure 2A:
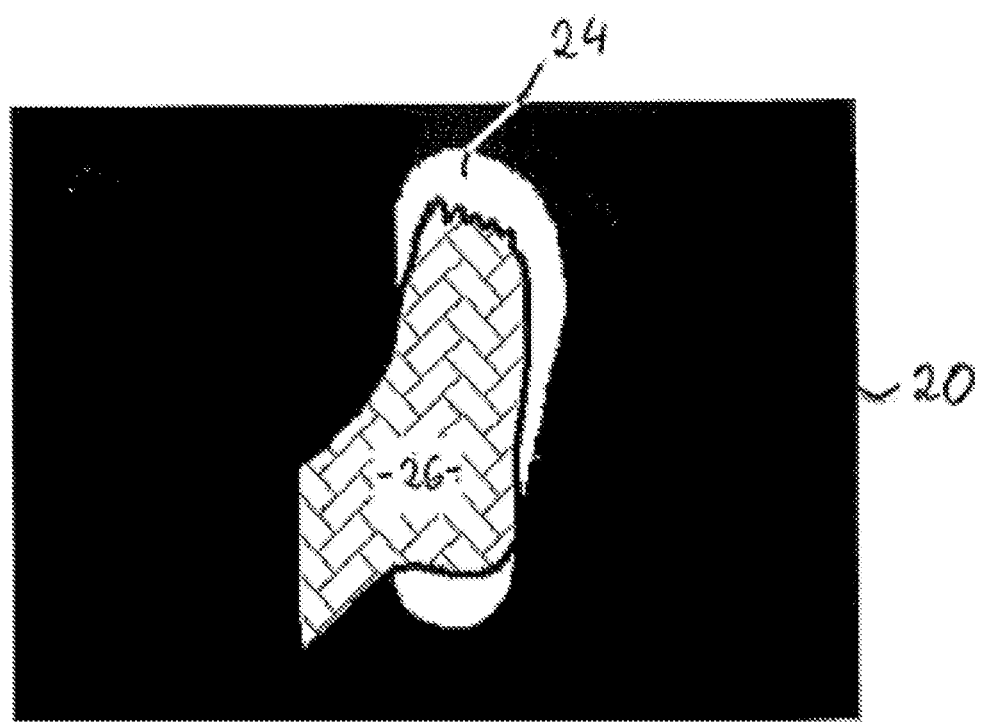
FIGS. 2a, 2b, 2c show the comparison of a foot sole 14 with footbed outlines 20, 21 and 22 of three different possible shoes represented to scale on a flat screen.

FIG. 2a shows the representation of a footbed outline 24 to scale on the flat screen 20. A foot 26 is positioned on the footbed outline such that preferably only a circumferential edge of the represented outline remains visible. In FIG. 2a, in the toe region, very much of the represented outline can be perceived, similarly in the heel region. On the other hand, the foot abuts the outline at the lower outer edge. The shoe will not fit.

Figure 2B:
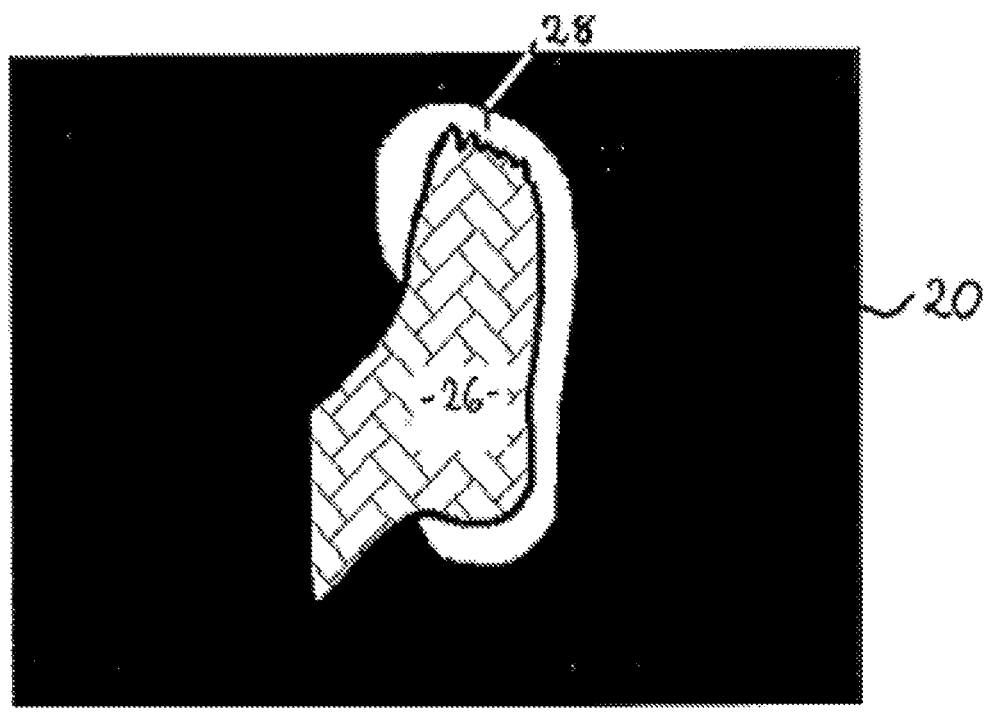

In FIG. 2b, a footbed outline 28 of another shoe model is represented, on which the foot 26 is positioned. Here too, an approximately uniform narrow circumferential edge of the represented outline does not appear. In the region of the big toe, very much of the outline is perceivable. Overall, the visible edge is too wide for a precisely fitting shoe.

Figure 2C:
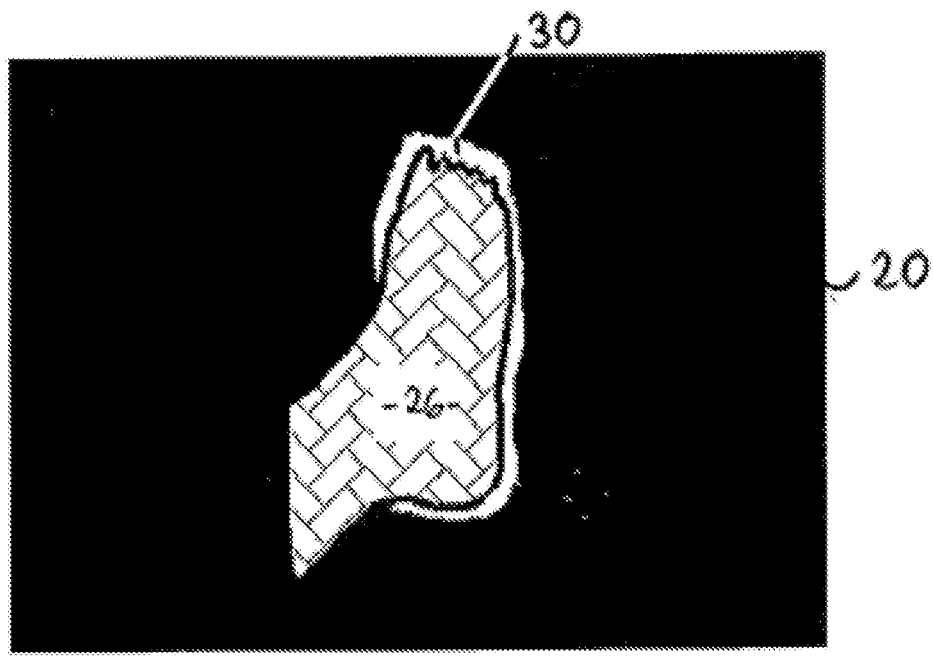

In contrast, FIG. 2c shows a footbed outline 30 of a shoe fitting the foot 26 to be dressed on the screen 20. The visual comparison of the represented footbed outline 30 with the foot 26 to be dressed shows that only a narrow, approximately uniform edge of the represented outline remains visible. This shoe model fits concerning shape and size as far as the footbed shape is concerned.

According to the invention, now, a comparison of the foot to be dressed with the dimensionally accurate outline of a section through the inner shoe is effected. This step is explained based on FIGS. 3a to 3c.

Figure 3A:
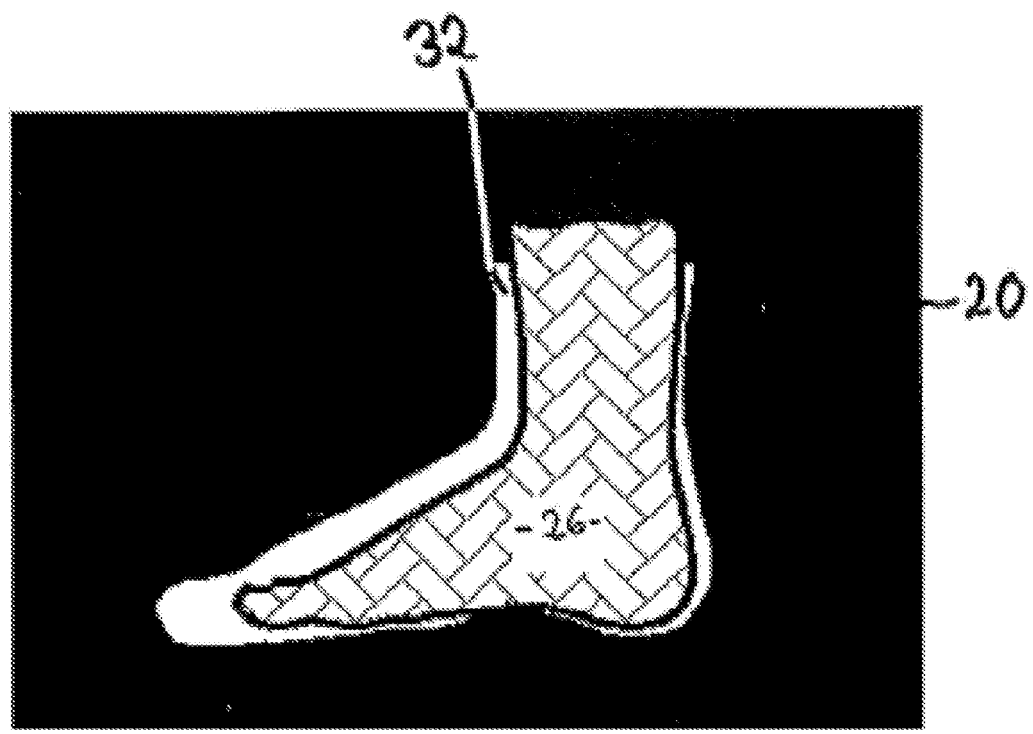
FIGS. 3a, 3b, 3c show the comparison of a foot side view 15 with sectional outline of three different possible shoes represented to scale on a flat screen, measured at the location of the largest length (heel to big toe)

FIG. 3a shows the comparison of the foot 26 with a sectional outline 32, which is represented on the flat screen 20. The visual interpretation is also simple for the layperson. The shoe, the sectional outline 32 of which is represented is too long and too high.

Figure 3B:
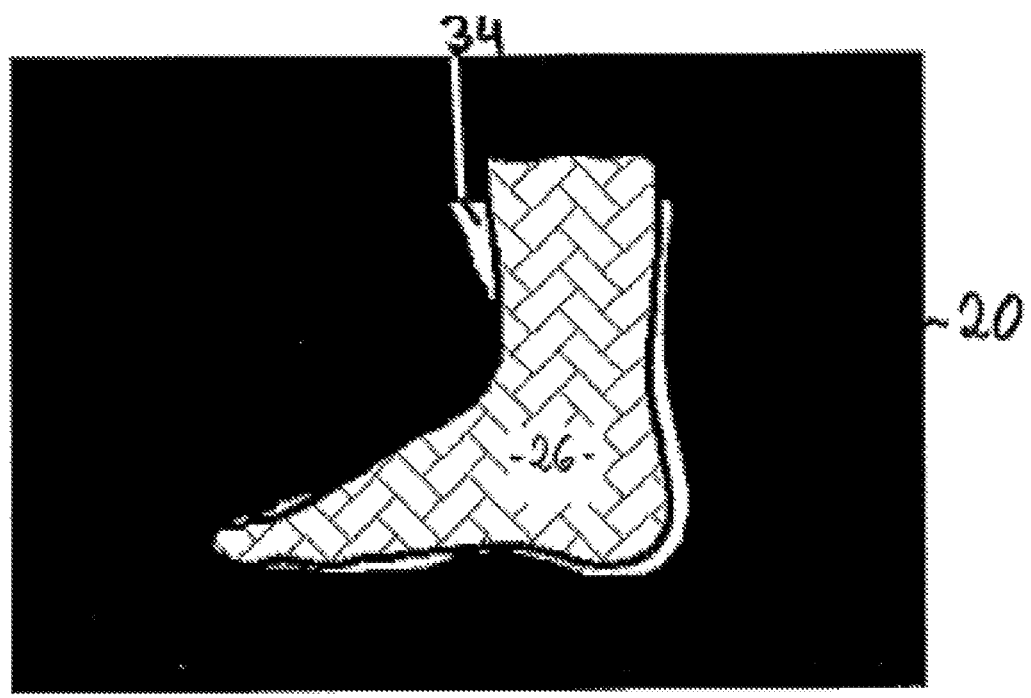

FIG. 3b shows a lateral or sectional outline 34 of another shoe for the same foot 26 on the flat screen 20. Here too, the interpretation is obvious. The shoe, with which the represented side view 34 is associated, is too short and the interior space in the region of the transition from the forefoot to leg is too tight.

Figure 3C:
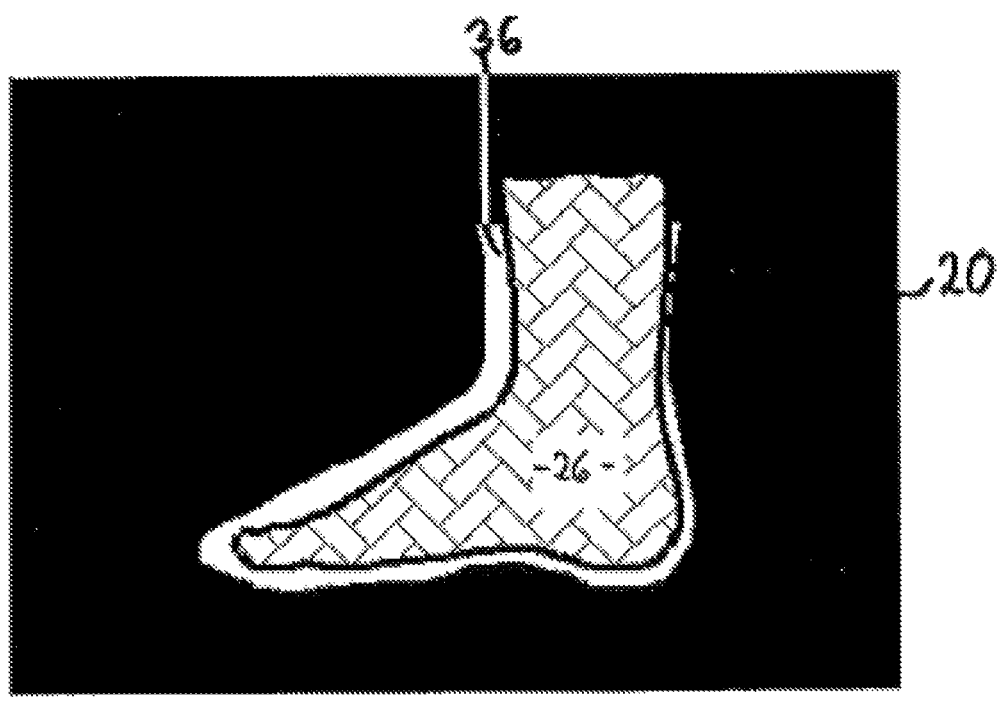

On the other hand, FIG. 3c shows a sectional outline 36 of a fitting shoe. There is sufficient free space in the toe region and the fit to the heel has both the correct shape progress and sufficient free space to the inner shoe wall.

Naturally, in the event that there is no coincidence with the footbed outline according to FIG. 2c, the customer would first have viewed the lateral outline for this shoe. If the result is as represented in FIG. 3c in this examination, thus a precisely fitting shoe is found.

The visual examination of the fit is thereby realizable easily and without extensive training by the customer, since it takes advantage of a base knowledge of the foot anatomy and the shoe fit generally present at least in the adult population, with which each human, which already purchased shoes in his life, has been faced:

"Footwear fits if upon consideration of the footbed, a sufficient shoe length and sufficient free space in the toe region are present AND if in the region of the top foot, sufficient height in the entire shoe interior space occupied by the foot is present, wherein the heel rather abuts fixedly guided the shoe inner wall of the heel region."

However, this base knowledge can also be learned via the online connection to the shoe portal in the form of an instructional film or the like.

In particular, the method according to the invention also allows to perform a fit control separately for the left and the right foot and thereby to order online a shoe fitting to each foot for the quite great number of customers having a different shoe size and shape on the left and right.

Figure 4:
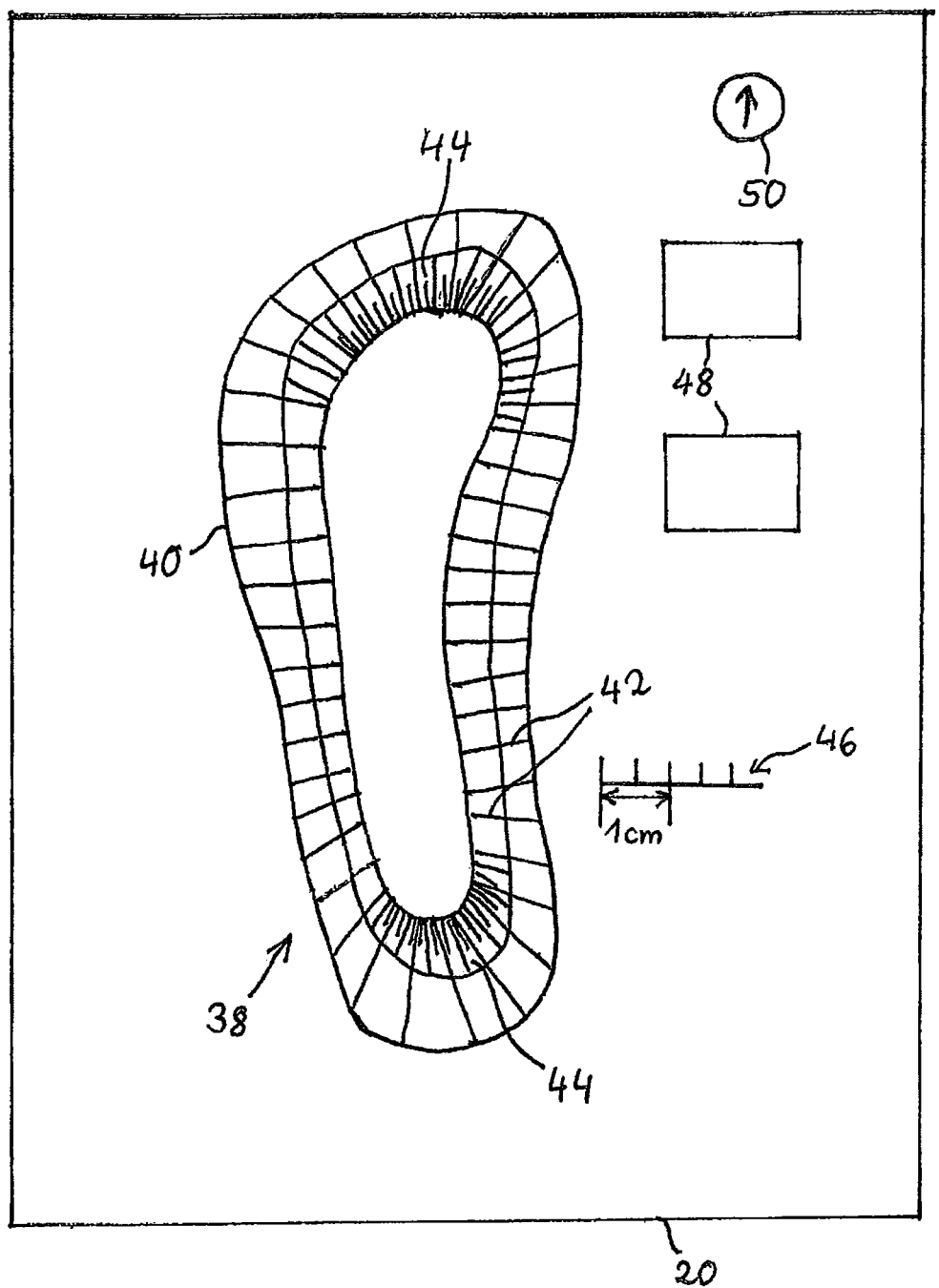
FIG. 4 shows a footbed outline of a preferred graphical design.

FIG. 4 shows a preferred representation of a footbed outline 38 on the flat screen 20. From the already given description it should be clear that the background area again can mostly be black, in any case in distinct contrast to the outline 38. For the distinguishability of the reference characters, a black coloration has been omitted in FIG. 4.

The edge region of the footbed outline 38 is graphically designed such that the customer can easier recognize if the visible edge region is in an optimum order or if the footbed outline is already too large, i.e. a too large edge strip remains visible, if a foot not represented in FIG. 4 is positioned thereon. Thus, an impression of the amount of the deviation easily to be visually interpreted arises. In the outline 38, a texture proceeding radially to the outline edge 40 is provided, which is here exemplarily composed of dashes 42, wherein the texture provokes a more intensive visual impression with increasing distance from the outline edge 40, in the example the dash distance is decreased. Thereby, great deviations between represented outline and foot outline appear more intensive than smaller ones. This progress region is limited to a strip-shaped edge zone of the outline. Other textures or else the use of color gradients are possible. Further graphic designs assisting the visual shape comparison of foot outline and silhouette are state of the graphical-artistical design and thereby known to the man skilled in the art. The graphical edge representation is of course also transferable to the sectional outlines.

As represented in FIG. 4, zones 44, which are particularly critical for the accuracy of fit of shoes, e.g. the toe region and the heel region, can have a different texture such that mismatches particularly obviously emerge in this region. In FIG. 4, the dash distance was exemplarily once again reduced.

Advantageously, on the screen 20, at the same time, further operation or information fields can be superimposed. A scale 46 is exemplarily shown, as well as fields 48, by which e.g. as explained below different operating modes can be selected. The load of a small photo of the just "tried on" shoe is also conceivable and the possibility of offering a rotation tool.

In order to accelerate the selection process for precisely fitting shoes, there is an operating mode in the preferred embodiment, in which outline representations to scale to shoes of the same shoe model with different shoe sizes are automatically consecutively displayed. In another operating mode, which can be alternatively or additionally provided, outline representations to scale to shoes of the same shoe size, but associated with different shoe models are automatically consecutively displayed. These different operating modes can for example be selected via the information fields 48 superimposed on the background area. In order that the customer does not have to unnecessarily strain in aligning the foot, rotation tools 50 can be provided, which allow alignment of the outlines at the foot position in front of the screen.

In order to ensure that customers of an online shoe shop also really utilize the possibilities of the precisely fitting selection of shoes, the submission of an order can be coupled to the fact that the outlines of the corresponding shoe must have been displayed. Otherwise, the submission of the order is blocked.

With high-heeled ladies' shoes, upon comparison of the foot side view with the sectional outline of the inner shoe, it can be required that the customer brings her foot in the position later occupied in the shoe, that is, she approximately stands on the toes. It is advantageous that the comparison thus occurs in the position actually later occupied, since the shape of the foot in for example a high-heeled shoe cannot be inferred from a rest position of a foot without further ado.

With a very large existing selection of shoes with very different shoe models and size associations with the foot length varying from manufacturer to manufacturer, the selection process can become relatively long, since the customer has to click through many shoe models and shoe sizes until he finds something fitting.

In a preferred embodiment, therefore, the search space in the database is restricted by previously inputting the outline of the foot to be dressed. In the preferred embodiment, to this, a touch-sensitive screen is used at the customer, which is large enough for a foot. The foot positioned on the screen is traced in its outline with a stylus or the finger and this outline is evaluated by the data processing system and used for restricting the search space in the database. If a touch-sensitive screen is not present, alternatively, the foot can also be placed on a sheet of paper in known manner and the outline can be traced with a pen. The outline thus obtained can then be converted to electronic form via a scanning operation and transmitted to the data processing system, optionally with dimensioning.

Figure 5:
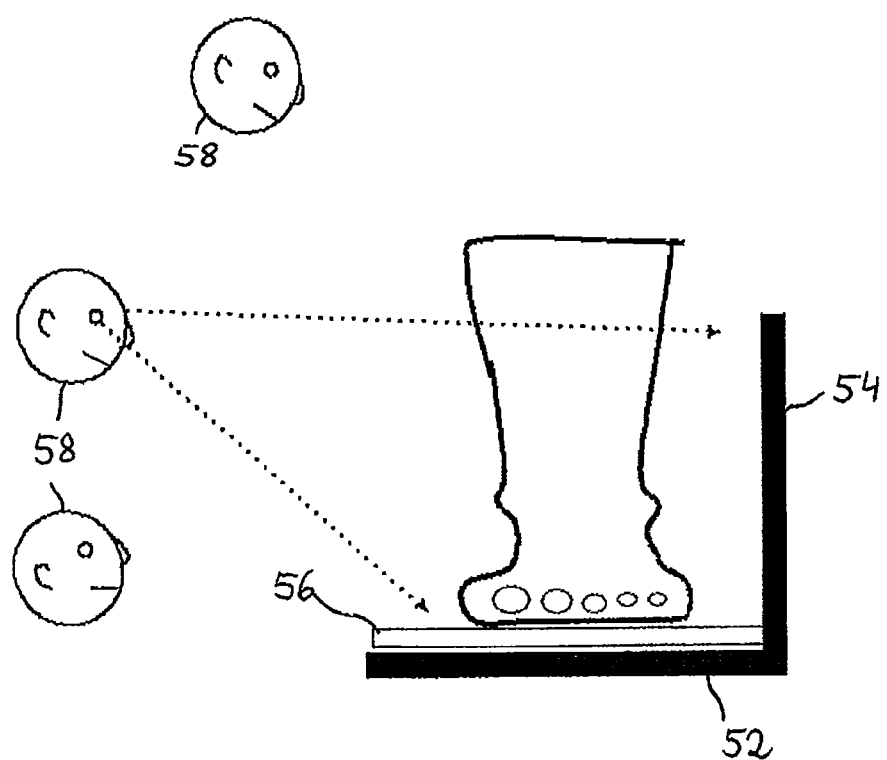
FIG. 5 shows an assembly according to the invention for performing the method in a shoe shop for assisting the sales personnel.

FIG. 5 shows an assembly according to the invention for performing the method in a shoe shop for assisting the sales personnel. The customer stands on an assembly of two flat screens 52 and 54 disposed orthogonally to each other, wherein the horizontal screen 52 is protected by a strong glass plate 56. A plastic plate is also possible as long as it is transparent and securely protects the underlying screen. The vertical screen 54 is provided for representing the outline of the longitudinal section through the interior space of a shoe. The horizontally disposed screen 52 each shows the footbed outline for the same shoe at the same time. The two outlines are disposed to each other such that the sales personnel, symbolized by heads 58, can perform both the comparison of the foot side view with the sectional outline and the comparison between the footbed outline and foot outline without the customer having to move. From a center position, the sales personnel therein observes the superposition of the foot side view with the sectional outline and they observe the conformity of the foot border with the footbed silhouette represented on the screen 52 from a steeper viewing position. The glass plate 56 has a distance to the flat screen 52 as low as possible in order that parallel offset is not perceivable upon view. It is selected so thick that it does not deflect and withstands the weight of the customer.

Thereby, with a modest technical effort, the sales personnel are effectively assisted upon determining a fitting shoe and at least the number of the shoes to be tried is considerably reduced. Thereby, the teaching of the inventive idea is capable of increasing the productivity and the quality of consulting of the sales personnel with a very low hardware expense.

The required data is preferably stored on an external server as in the online business, to which the sales personnel also accesses online. The assembly also allows to additionally offer shoes from a catalogue, which are not in stock, to the customer in the shoe shop.

In summary, it has to be stated that customers, who neither can try on shoes nor can have high-quality dialogue with trained sales personnel in an online shoe order, obtain additional shape information about the difference between the shape of the shoe interior space and the shape of the foot to be dressed in a form easily assessable by them by provision of both a footbed outline and a lateral outline, from which they can well extrapolate the degree of fit. Because a good fit requires besides the description of the footbed also information on the fit of the interior shoe space to the foot. Customers in a shoe shop can reduce the number of shoes to be tried on or additionally resort to a catalogue offer.

Complete 3D information is not required, but two-dimensional outlines of the specific shoe already are sufficient, namely the footbed outline and the already discussed sectional outline.

It is fundamental to the inventive idea that the (online) customer does not require any auxiliary tools such as printed foot sole templates, measuring tape, simple sliding calipers for measuring the foot length in heretofore worn shoes etc.

The inventive idea also does not only restrict to the selection of the best fit for street shoes, but all types of footwear such as sports shoes, orthopedic shoes etc. are encompassed.

If the footwear to be ordered is to be worn with a certain stocking/sock, thus, the outline of the bare foot is not compared with the two screen silhouettes, but the correspondingly dressed foot.

This application claims priority from German Patent Application No. 10 2010 027 390.2 filed Jul. 16, 2010, which is hereby incorporated by reference herein in its entirety.

The invention claimed is:

1. A method for selecting a shoe, to be fitted to a foot from a plurality of shoes, wherein the method comprises:
storing in a database, for each shoe from the plurality of shoes, data describing dimensionally accurate outlines of a footbed of the shoe and dimensionally accurate outlines of a section through the shoe, wherein the sectional plane runs perpendicularly to the footbed and along the way of the largest foot length of a foot positioned in the shoe; transmitting, from a server in communication with the database, to a remotely located computer, data sufficient to cause the remotely located customer computer to display on a flat screen an actual size outline of the footbed of the shoe occurring for each shoe from the plurality of shoes, wherein the design of the outline area is in distinct contrast to the design of the background area;
transmitting to a remotely located computer data sufficient to cause the remotely located customer computer to display on a flat screen an actual size outline of a section through the shoe occurring for each shoe from the plurality of shoes, wherein the sectional plane runs perpendicularly to the footbed and along the way of the largest foot length of a foot positioned in the shoe, wherein the design of the outline area is in distinct contrast to the design of the background area;
requesting a potential purchaser to position a foot on and in front of the flat screen, respectively, such that only a circumferential edge of the displayed footbed outline and outline of a section, respectively, remains visible;
requesting the potential purchaser to visually compare the displayed footbed outline and outline of a section, respectively, with the foot to be dressed by assessing the edge of the displayed outline remaining visible with respect to size and progress; and
receiving an order from the potential customer, via the remotely located computer, for a shoe corresponding to the displayed footbed outline and outline of a section, respectively.

2. The method according to claim 1, wherein the outline area of the footbed outline and of the outline of a section, respectively, is represented bright and the background area is represented dark on the screen.

3. The method according to claim 1, wherein the edge region of the footbed outline or of the outline of a section is graphically designed such that an impression of the amount of deviation between the represented outline and the outline of the foot easily to be visually interpreted arises.

4. The method according to claim 3, wherein the graphical representation is composed of a color gradient proceeding radially to the outline edge, in which the color provokes a more intensive visual impression with increasing distance, such that large deviations between represented outline and foot outline appear more intensive than smaller ones and that this gradient region is limited to a strip-shaped edge zone of the outline.

5. The method according to claim 3, wherein a graphical design is composed of a texture proceeding radially to the outline edge, wherein the texture provokes a more intensive visual impression with increasing distance such that great deviations between represented outline and foot outline appear more intensive than smaller ones and that this gradient region is limited to a strip-shaped edge zone of the outline.

6. The method according to claim 1, wherein at least one of additional information fields and scales are superimposed on the background area.

7. The method according to claim 1, wherein representations of the footbed outline and of the outline of a section are automatically represented consecutively in time for several shoes on the flat screen.

8. The method according to claim 7, wherein the representations automatically consecutively displayed are associated with shoes of the same shoe model with different shoe size or are associated with shoes of the same shoe size, but different shoe models.

9. The method according to claim 1, wherein for feet larger than the area of the flat screen, the representation of the footbed outline and of the outline of a section is split in one corresponding to the front foot portion and a second one corresponding to the rear foot portion.

10. The method according to claim 1, wherein the representations of the footbed outline and of the outline of a section to scale are provided on an Internet site of an online seller, and an order can only be submitted if the outlines of the ordered shoe have previously been represented in the ordered shoe size.

11. The method according to claim 10, wherein base knowledge for assessing the fit can be learned or trained via visual comparison of the foot outlines with the represented outlines via an Internet tutorial.

12. The method according to claim 1, wherein an outline of the foot to be dressed is acquired, and due to this outline, a pre-selection of possibly fitting shoes from the plurality of shoes is made.

13. The method according to claim 12, wherein the outline of the foot to be dressed is acquired by tracing the foot outline with the finger or a stylus on a touch-sensitive screen.

14. Assembly for selecting a shoe fitted to a foot from a plurality of shoes, comprising:
a data processing system including
a database, in which dimensionally accurate outlines of the footbed and dimensionally accurate outlines of a section through the shoe, wherein the sectional plane runs perpendicularly to the footbed and along the way of the largest foot length of a foot positioned in the shoe, are stored in electronic form for each shoe from the plurality of shoes;
a server configured such that the outlines of the footbed and of a section through the shoe stored in the database can be transmitted to a terminal via a transmission link such that actual size display of the outlines to scale is possible on a flat screen associated with the terminal wherein the server transmits to the terminal data sufficient to cause the terminal to display on a flat screen an actual size outline of the footbed of the shoe occurring for each shoe from the plurality of shoes, wherein the design of the outline area is in distinct contrast to the design of the background area, and transmits to the terminal data sufficient to cause the terminal to display on a flat screen an actual size outline of a section through the shoe occurring for each shoe from the plurality of shoes, wherein the sectional plane runs perpendicularly to the footbed and along the way of the largest foot length of a foot positioned in the shoe, wherein the design of the outline area is in distinct contrast to the design of the background area;

the terminal requests a potential purchaser to position a foot on and in front of the flat screen, respectively, such that only a circumferential edge of the displayed footbed outline and outline of a section, respectively, remains visible, and requests the potential purchaser to visually compare the displayed footbed outline and outline of a section, respectively, with the foot to be dressed by assessing the edge of the displayed outline remaining visible with respect to size and progress; and the server receives an order from the potential customer, via the terminal, for a shoe corresponding to the displayed footbed outline and outline of a section, respectively.

15. Assembly for simultaneous actual size representation of the footbed outline and the outline of a section for a shoe corresponding to the method according to claim 1, comprising a first flat screen for representing the footbed outline and a second flat screen for representing the outline of a section, wherein the first flat screen and the second flat screen are connected to each other such that they are perpendicular to each other, and further comprising a hardwearing transparent plate which is disposed on or slightly above the first flat screen and parallel to it.

16. The method according to claim 2, wherein the edge region of each of the footbed outline and of the outline of a section, respectively, is graphically designed such that an impression of the amount of deviation between represented outline and the outline of the foot easily to be visually interpreted arises.

* * * * *